(12) United States Patent
Günther (10) Patent No.: US 10,424,770 B2
(45) Date of Patent: Sep. 24, 2019

(54) BATTERY HOUSING

(71) Applicant: Kirchhoff Automotive Deutschland GmbH, Attendorn (DE)

(72) Inventor: Alexander Günther, Olpe (DE)

(73) Assignee: Kirchhoff Automotive Deutschland GMBH, Attendorn (DE)

( * ) Notice: Subject to any disclaimer, the term of this patent is extended or adjusted under 35 U.S.C. 154(b) by 101 days.

(21) Appl. No.: 15/679,000

(22) Filed: Aug. 16, 2017

(65) Prior Publication Data

US 2018/0062128 A1  Mar. 1, 2018

(30) Foreign Application Priority Data

Aug. 23, 2016 (DE) .................. 10 2016 115 645

(51) Int. Cl.
  *H01M 2/10* (2006.01)
(52) U.S. Cl.
  CPC ....... *H01M 2/1083* (2013.01); *H01M 2/1088* (2013.01); *H01M 2/1094* (2013.01); *H01M 2220/20* (2013.01)
(58) Field of Classification Search
  CPC . H01M 2/1083; H01M 2/1088; H01M 2/1094
  See application file for complete search history.

(56) References Cited

U.S. PATENT DOCUMENTS 3,514,341 A * 5/1970 Cook ................... F16K 15/142
                                                        429/53
2008/0254340 A1* 10/2008 Blakey ................ H01M 12/065
                                                        429/407

FOREIGN PATENT DOCUMENTS

| DE | 102007063191 A1 | 6/2009 |
| DE | 102011109249 A1 | 2/2013 |
| DE | 102013201365 A1 | 7/2014 |
| DE | 102014215032 A1 | 2/2016 |

OTHER PUBLICATIONS

Office Action dated Apr. 19, 2017 in parent German application DE 102016115645.0.

* cited by examiner

*Primary Examiner* — Olatunji A Godo
(74) *Attorney, Agent, or Firm* — Polson Intellectual Property Law, PC; Margaret Polson (57) ABSTRACT

A battery housing having a battery chamber sealed to prevent the penetration of moisture and which accommodates at least one battery module, and a pressure equalization device to compensate for pressure fluctuations between the battery chamber and its outside environment. The pressure equalization device comprises a pressure equalization chamber fluidly connected to the battery chamber and a separating member arranged therein. The separating member is sealed off from the inner wall of the pressure equalization chamber, wherein the fluid connection with the battery chamber opens in a first chamber region of the pressure equalization chamber which is separated by the separating member from a second chamber region. The separating member permits a volume change in one of the chamber regions given a corresponding volume change in the other chamber region. The second chamber region is in fluid communication with the outside of the battery chamber via a venting path.

19 Claims, 6 Drawing Sheets

BATTERY HOUSING

CROSS REFERENCE APPLICATIONS

This application claims the benefit of German Application No. 10 2016 115 645.0 filed Aug. 23, 2016, which is incorporated herein by reference for all purposes.

BACKGROUND

The present disclosure relates to a battery housing, having a battery chamber which is sealed to prevent penetration of moisture and which serves to accommodate at least one battery module, and having a pressure equalization device to compensate for pressure fluctuations between the battery chamber and the outside thereof.

Electromechanically driven vehicles, such as passenger cars, floor conveyor vehicles or the like, use battery modules as current storage devices. Such battery modules are typically composed of a plurality of individual batteries. These batteries are so-called high-voltage batteries. There are certain requirements for the housing of the battery modules which are necessary for an operation of such a vehicle. It is essential that the battery module(s) is/are protected in their battery housing from external conditions. In addition, it is necessary to house the battery module or modules in a battery housing which is sealed to prevent the penetration of moisture, so as to prevent condensation inside the battery housing. Moisture which penetrates into the battery chamber of the battery housing can lead to a short circuit and a resulting fire in the battery module.

A battery housing is known from DE 10 2014 215 032 A1, in which a battery module consisting of a plurality of battery cells is accommodated in a watertight manner in a housing formed from pressure plates, U-shaped profiles and covers. This known battery housing has an emergency degassing device which can release gas to the exterior in the event of overpressure arising in the interior of the housing, thereby relieving the overpressure. Such an overpressure can be caused by excessive heating of the battery module. The emergency degassing device is furnished as a gas-permeable but water-impermeable membrane. This membrane can also serve the purpose of creating a constant pressure equalization between the battery chamber and the outside environment. A disadvantage of this known emergency degassing device is that an overpressure in the battery chamber can only be relieved to such an extent as is permitted by the gas-permeable membrane. Such a membrane does not allow pressure reduction in the event of a rapid pressure build-up in the battery chamber. Instead, the battery will burst. The same is true in the case of a vacuum which arises rapidly in the battery chamber—which can occur, for example, after a fire in a cell.

DE 10 2011 109 249 A1 describes a battery housing which has a venting device. This comprises a rupture disk, which bursts when an overpressure is built up. The venting device known from this document does not serve the purpose of establishing a constant pressure equalization between the battery chamber and the outside of the battery housing.

DE 10 2007 063 191 A1 discloses a battery housing which is equipped with an overpressure valve. This opens when there is an overpressure in the battery chamber. It is not possible with the battery housing of this prior art to compensate for a negative pressure which arises in the battery chamber.

DE 10 2013 201 365 A1 discloses a battery module having a degassing channel connected thereto. This enables controlled degassing in the event of an overpressure in a battery chamber, and at the same time enables protection for the remaining battery chambers. However, this process is not reversible, such that there is no constant pressure equalization. In particular, it is not possible to compensate for a vacuum in the battery chamber.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Proceeding from the prior art discussed above, an aspect of the present disclosure is therefore to further develop a battery housing of the type mentioned at the beginning in such a way that the pressure equalization device prevents the penetration of moisture during normal operation of the battery module(s) located in the battery chamber, and wherein a rapid reduction of overpressure does not lead to destruction of the pressure equalization device.

According to the present disclosure, this aspect is achieved by a battery housing of the generic type mentioned at the outset, in that the pressure equalization device comprises a pressure equalization chamber which has a fluid connection to the battery chamber and in which a separating member is arranged which is sealed off from the inner wall of the pressure equalization chamber, wherein the fluid connection opens into the battery chamber in a first chamber region of the pressure equalization chamber which is separated by the separating member from a second chamber region, said separating member permitting a volume change in the one chamber region given a corresponding volume change in the other chamber region, wherein the second chamber region is in fluid communication with the outside of the battery chamber by means of a venting path.

The term "battery chamber" used in the context of this description means the volume in which the battery module or modules is/are arranged. The term "battery housing" refers to the parts enclosing the battery chamber.

In this battery housing, a pressure equalization chamber serves in the manner of a pressure equalization volume in order to compensate for pressure fluctuations occurring during normal operation of the battery module(s) in the battery chamber. A separating member located in the pressure equalization chamber separates the chamber region, which is in fluid communication with the battery chamber, from a second chamber region which is in fluid communication with the outside of the battery chamber and/or the battery housing. Both chamber regions are separated from one another in a moisture-impermeable manner by the separating member. Thermally induced expansion of the air in the battery housing results in an increase in the pressure in the first chamber region of the pressure equalization chamber, said chamber region in fluid communication with the battery chamber. On account of the changeability of the separating member, in such a case, the separating member is moved in the direction of the end-face termination of the second chamber region until the pressure is balanced in both chamber regions. This is accompanied by a volume enlargement of the first chamber region and a corresponding reduction in size of the second chamber region.

As a separating member for separating the two chamber regions in the pressure equalization chamber, a gas- and moisture-impermeable, elastic and/or highly elastic membrane can be used, for example. Such a membrane, which separates the two chamber regions, may be elastic and/or highly elastic, and thus extensible, so as to provide the desired volume change in the adjacent chambers. In this embodiment, a volume enlargement of the one chamber region occurs when the volume of the other chamber region is reduced against the elastic restoring force of the membrane. In another embodiment, the membrane is not elastic but has a surface area greater than the cross-sectional area of the pressure equalization chamber in which it is arranged. Due to the larger surface area of this membrane, it can extend into the chamber region with the lower pressure when there is a difference in pressure between the two chamber regions. The size of this membrane is adapted to the size of the chamber regions. Such a membrane may be folded to give it a certain shape. It should be understood that such a membrane can also have certain elastic properties.

In another embodiment, there is a piston which can move within the pressure equalization chamber. The piston is sealed against the inner wall of the pressure equalization chamber. This ensures that no moisture penetrates into the piston chamber and enters the battery chamber via the fluid connection during a piston movement, in particular during a movement of the piston in which the volume of the first chamber region is reduced. For sealing purposes, the piston carries at least a circumferential seal which acts with a certain pretension against the inner wall of the pressure equalization chamber. O-ring seals can be used as the seals, by way of example, even in a design as a lip seal by means of which the desired tightness can also be provided against the inner wall of the pressure equalization chamber even at low pressing forces.

The cross-sectional area of flow of the fluid connection between the battery chamber and the first chamber region of the pressure equalization chamber can be arbitrarily selected—in particular, large enough that pressure equalization can take place essentially spontaneously as soon as the friction between the outer surface of the piston and the inner side of the pressure equalization chamber is overcome.

The fluid path between the second chamber region and the outside of the battery chamber can be designed as a bore which passes through the end wall which closes off the end face of the second chamber region.

In one implementation, the pressure equalization device additionally has an overpressure valve as an emergency degassing device. This overpressure valve serves the purpose of relieving an overpressure arising in the battery chamber even if it is no longer possible to achieve an equalization using the mobility of the piston inside the pressure equalization chamber—or in any case, not to a sufficient degree. Since typically the battery housing is designed in such a way that, in normal operation, the mobility of the piston and the accompanying enlargement and/or reduction of the volume of the first chamber region, and thus of the total gas volume in the battery chamber, the fluid path, and the first chamber region, is sufficient, the relief valve is typically used for the purpose of equalizing an excessive overpressure in a circumstance which deviates from a normal operation of the battery module(s) accommodated in the battery chamber. Such an overpressure can occur, for example, in a battery module fire. The overpressure valve, which opens in the battery chamber when its opening pressure is reached, serves to reduce such an overpressure. The increased pressure in the battery chamber is then relieved via the pressure relief valve. The relief of an excessive pressure is desirable in order to prevent an explosion or a deformation of the battery chamber and/or of the battery housing and/or an encroachment on adjacent battery chambers. Once the overpressure is relieved, the pressure relief valve closes. The open overpressure valve typically establishes a direct fluid connection between the first chamber region of the pressure equalization chamber and the outside of the battery housing. Since this is only opened when an overpressure prevails in the battery chamber, no moisture can penetrate into the battery chamber through the overpressure valve when in its open position.

Part of such an overpressure valve is a venting opening, which can be designed, for example, as a bore. The bore is preferably oriented in a direction such that the escaping gas is not directed towards the interior of a vehicle. A tube, a hose or the like can be connected to this venting opening to direct escaping gas away from the vehicle in which the battery housing is arranged.

According to one embodiment, the overpressure valve is opened by the piston, and the piston is therefore the movable part of such an overpressure valve. In an implementation of such a design of the battery housing, the piston acts in its end position inside the pressure equalization chamber, in which the volume of the first chamber region is greatest, against a compression spring biased by the piston. This compression spring is typically supported on the end wall terminating the second chamber region. The compression spring functions to return the piston, after the excess pressure has been relieved, by a certain amount so as to close a vent opening which is released by the piston in this end position. Otherwise, this vent opening is separated from the first chamber region by the piston. If it is opened, the overpressure in the first chamber region can be relieved via this vent opening. Once the overpressure is relieved, the piston is returned by the compression spring to its position which closes this vent opening and/or separates the same from the first chamber region.

In another embodiment, the piston itself carries an overpressure valve. When the opening pressure of this pressure relief valve is exceeded, the first chamber region is connected to the second chamber region, such that the positive pressure can be relieved into the second chamber region and can be relieved therefrom via the venting path.

In a further embodiment, the pressure equalization device additionally has a vacuum valve, irrespective of whether an overpressure valve is present or not. In one embodiment, the pressure equalization device has both a vacuum valve and an overpressure valve. In such a case, these valves may be designed as two-way valves. Typically, the piston carries this two-way valve. The provision of a vacuum valve serves the purpose of compensating a vacuum in the battery chamber which cannot be compensated by the mobility of the piston in the pressure equalization chamber. Such a situation occurs after a battery fire. Since such a vacuum equalization occurs only after a battery fire, and thus after a destruction of the battery module(s) in the battery chamber, it is not necessary for the supplied air to be free of moisture. This moisture can no longer damage the already-destroyed battery modules. Therefore, for the design of the vacuum valve, it is possible to establish a direct fluid connection between the outside of the battery housing and the first chamber region through the vacuum valve. According to a first embodiment of the provision of such a vacuum valve, the vacuum valve is switched by the piston, and thus brought into its open position. This can be achieved by the fact that the end wall, which delimits the first chamber region, carries the vacuum valve, and the vacuum valve has a valve tappet which is passed through this end wall and projects into the first chamber region. The valve tappet projects into the first chamber region far enough that the piston, in its end position in which the volume of the first chamber region is the least, acts against the valve tappet and presses the same into its open position. The vacuum valve is sealed in its closed position against the outside of the end wall by means of a sealing head formed on the valve tappet, by way of example.

A particular advantage of the battery housing according to the present disclosure, with its pressure equalization device, is that the pressure equalization device can be integrated into one or more frame components of a battery housing. These frame components are then designed as hollow-chamber profiles, wherein a piston is arranged to be able to move in each of these hollow-chamber profiles. The fluid paths for connecting the first chamber region to the battery chamber, and the second chamber region to the outside of the battery housing, can be provided through bores by which the respective chambers are connected to each other.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is further described below using embodiments and making reference to the accompanying figures, wherein.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
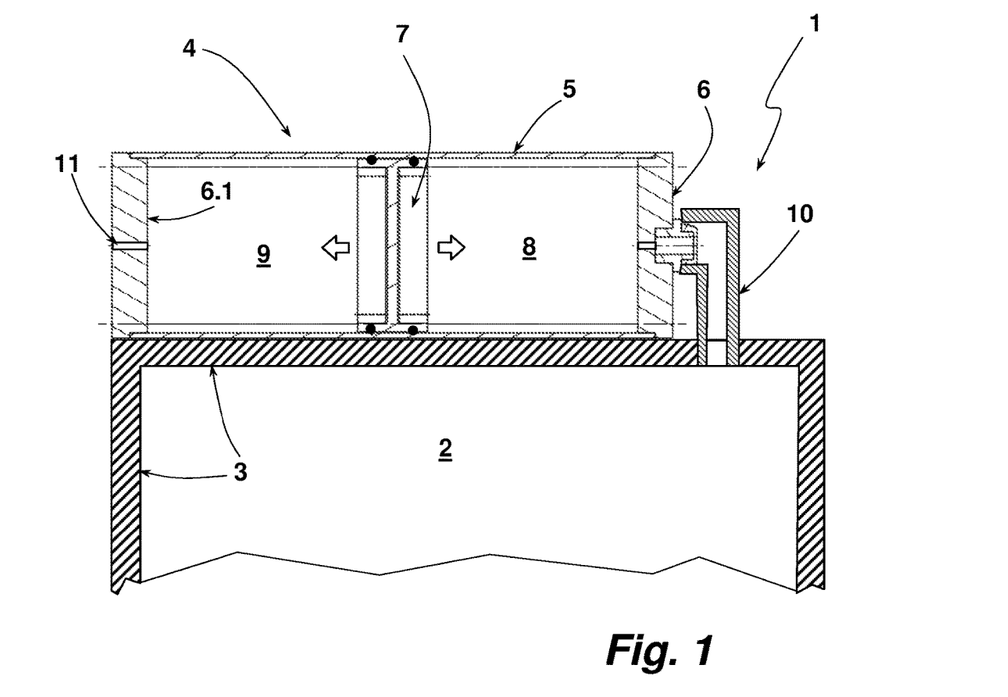
FIG. 1 shows a schematic, partial sectional view of a battery housing for a vehicle, having a pressure equalization device according to the present disclosure.

A battery housing 1 is shown schematically in FIG. 1. This comprises a battery chamber 2 into which one or more battery modules can be inserted. The battery chamber 2 is enclosed on all sides by walls 3.

FIG. 1 shows the battery housing 1 in a sectional view. In addition to the battery chamber 2, the battery housing 1 comprises a pressure equalization device 4 which is shown in a perspective single view in FIG. 2. FIG. 1 shows the pressure equalization device 4 in a longitudinal section. The pressure equalization device 4 of the illustrated embodiment is provided by a hollow chamber profile 5, which is square in cross-section, the end faces of which are each terminated by an end wall 6, 6.1. A pressure equalization chamber is provided by the hollow chamber profile 5 and the two end walls 6, 6.1. A piston 7 is arranged inside the pressure equalization chamber in a manner allowing movement in the longitudinal-axial direction. The same is sealed against the inner wall of the hollow chamber profile 5 using two annular seals. The pressure equalization chamber is divided into a first chamber region 8 and a second chamber region 9 by the piston 7. The first chamber region 8 is connected to the battery chamber 2 via a connecting tube 10, which in the illustrated embodiment is designed as an angle piece. The second chamber region 9 is in fluid communication with the outside of the battery housing 1 via a vent bore 11.

If a pressure which is higher than the ambient pressure is formed as a result of temperature fluctuations inside the battery chamber 2, by way of example, this pressure also prevails in the first chamber region 8 of the pressure equalization device 4. If this pressure is greater than the friction coefficient of the piston 7 against the inner wall of the hollow chamber profile 5, the piston 7 is shifted in the direction of the ventilation bore 11, increasing the volume of the first chamber region 8 and simultaneously reducing the volume of the second chamber region 9. This volume increase causes a pressure equalization. Accordingly, the piston 7 is moved in the other direction when the pressure in the battery chamber 2 is lower than the ambient pressure. The mobility of the piston 7 inside the pressure equalization chamber is indicated by block arrows.

Figure 2:
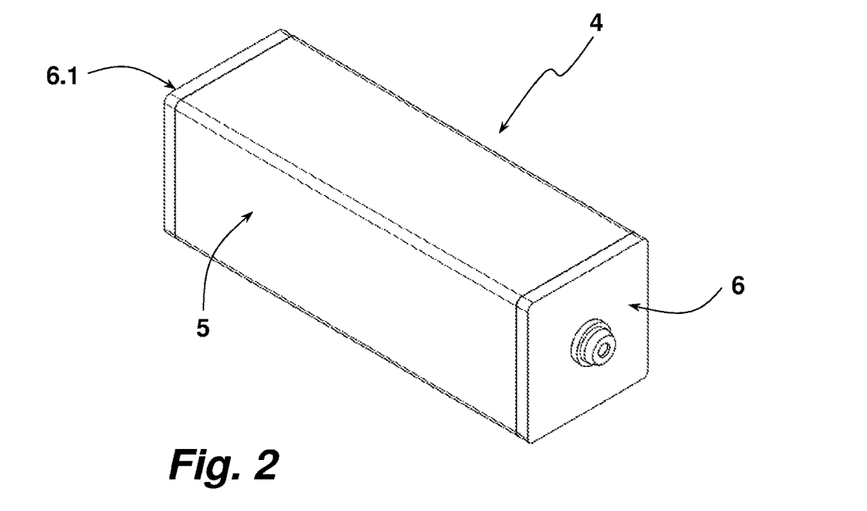
FIG. 2 shows a perspective view of the pressure equalization device of FIG. 1.
Figure 3:
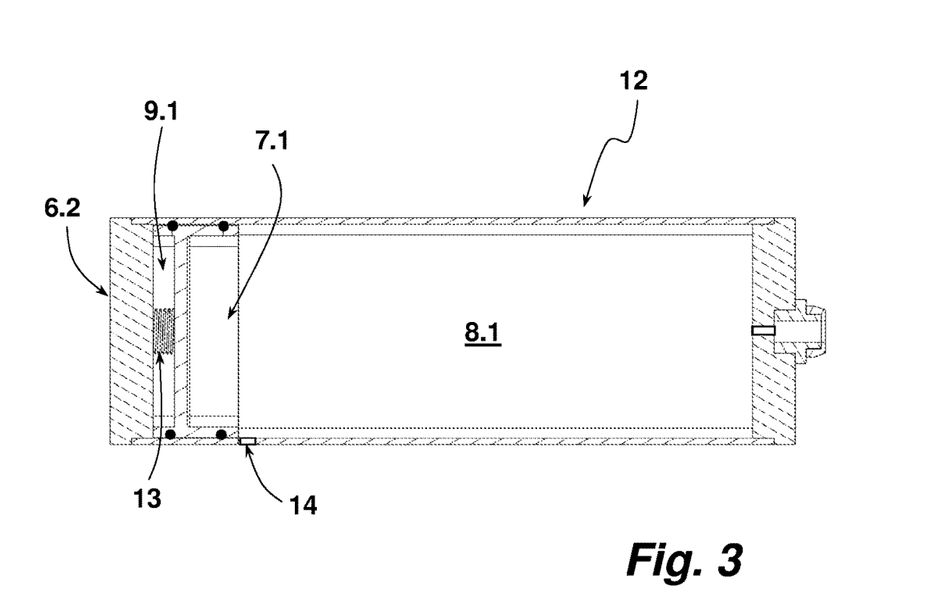
FIG. 3 shows a sectional view of a pressure equalization device generally corresponding to that of FIG. 2, in a first implementation.

FIG. 3 shows an implementation of the pressure equalization device 4 of FIGS. 1 and 2. This pressure equalization device 12 shows a fundamental construction, and is in fluid communication with a battery chamber as is the pressure equalization device 4. It differs therefrom by additionally having an overpressure valve for the purpose of relieving an overpressure in the battery chamber which can no longer be compensated by the mobility of the piston 7. For this purpose, the end wall 6.2 delimiting the second chamber region 9.1 bears a compression spring 13. The compression spring 13 is tensioned in FIG. 3, since the piston 7.1 is brought into its end position relative to the first chamber region 8.1 due to the overpressure in the same. This position shows the open overpressure valve. In this end position, a vent opening 14, which is otherwise separated from the first chamber region 8.1 by the piston 7.1, is released, and thus opened, and is in communication with the first chamber region 8.1. In this way, an overpressure in the first chamber region 8.1 which cannot be compensated by the piston movement alone can be relieved. When this is relieved, the piston 7.1, which has been brought by the overpressure into its position shown in FIG. 3, is moved back by the compression spring 13, such that the vent opening 14 is closed again. In this embodiment, the overpressure valve is thus provided by the piston 7.1, the compression spring 13 and the vent opening 14.

Figure 4:
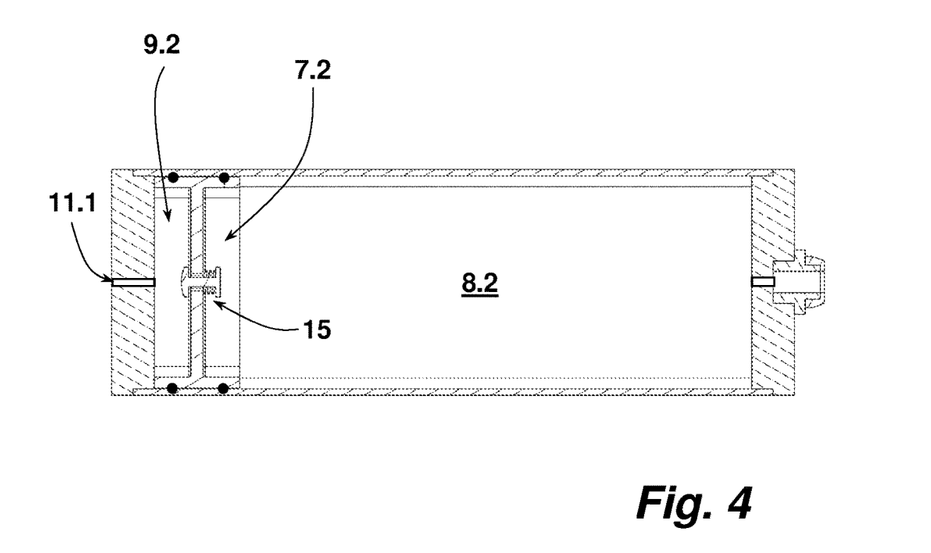
FIG. 4 shows a sectional view of a pressure equalization device generally corresponding to that of FIG. 2, in a second implementation.

FIG. 4 shows an alternative embodiment of an overpressure valve which has the functionality described for the construction described for FIG. 3. For this purpose, the piston 7.2 carries an overpressure valve 15, by which, when its opening pressure is exceeded, the first chamber region 8.2 is brought into fluid communication with the second chamber region 9.2, such that the overpressure can be relieved by the pressure relief valve 15, the second chamber region 9.2 and the vent bore 11.1. If the overpressure is relieved, the overpressure valve 15 closes.

Figure 5:
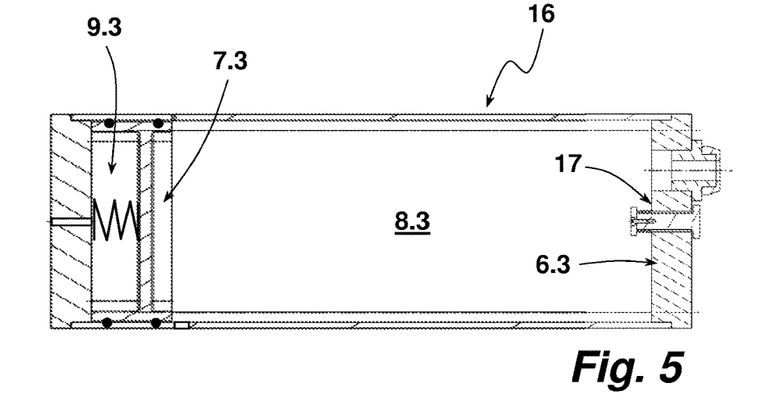
FIG. 5 shows a sectional view of a pressure equalization device generally corresponding to that of FIG. 2, in another implementation and in a first position.

FIG. 5 shows a further implementation of the pressure equalization device 12 of FIG. 3. Only the differences from the pressure equalization device 12 will be described below. The pressure equalization device 16 shown in FIG. 5 additionally comprises a vacuum valve 17, which is shown in FIG. 5 in its closed position. FIG. 5 shows the pressure equalization device 16 in a position in which an overpressure in the battery chamber, and thus in the first chamber region 8.3, is relieved via the vent opening described for the pressure equalization device 12.

Figure 6:
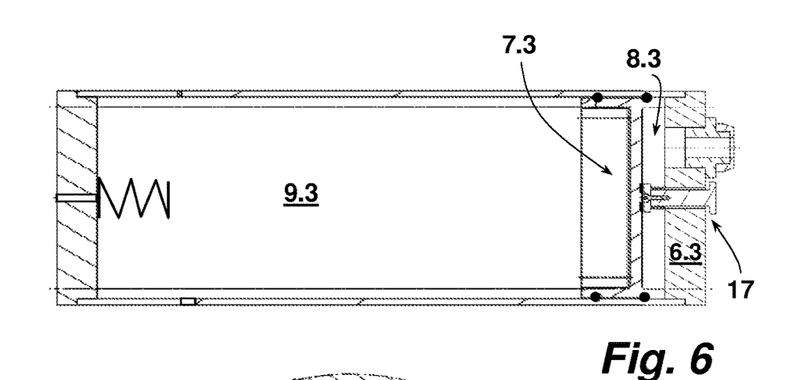
FIG. 6 shows the pressure equalization device of FIG. 5 in a second position thereof.
Figure 7:
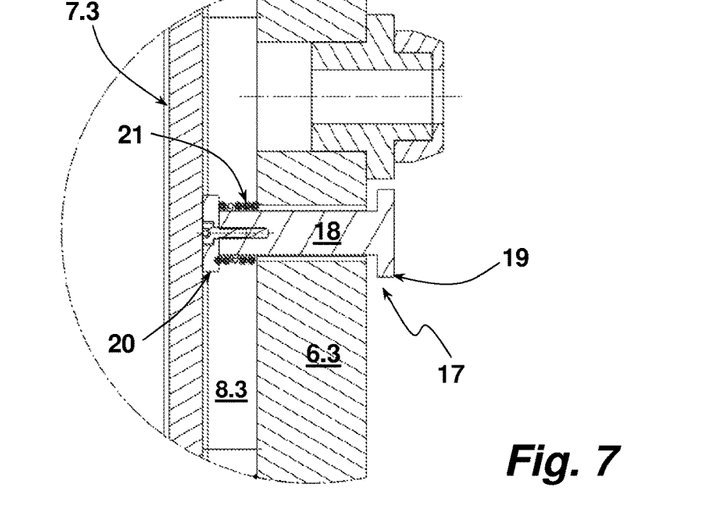
FIG. 7 shows a sectional enlargement in the region of the one end wall of the pressure equalization device of FIG. 6.

The vacuum valve 17 serves to relieve a vacuum prevailing in the battery chamber and thus in the first chamber region 8.3. The piston 7.3 is then, as shown in FIG. 6, in its end position opposite that shown in FIG. 5, and acts against the vacuum valve 17 in order to open it. This arrangement is shown in an enlarged view in FIG. 7. The vacuum valve 17 has a valve tappet 18 which passes through the end wall 6.3 which delimits the first chamber region 8.3. On the outside facing the end wall 6.3, the valve tappet 18 carries a sealing head 19, which in the illustrated embodiment is designed as a circumferential flange and acts to seal the vacuum valve 17 on its underside in its closed position against the outside of the end wall 6.3. A seal arranged at this location is not shown in FIG. 7 for the sake of simplicity. The valve tappet 18 projects into the first chamber region 8.3 and carries on its end on this side an actuating head 20 against which the piston 7.3 acts to open the valve 17. A closing spring 21 is supported on the underside of the actuating head 20, and is supported at its other end on the inside of the end wall 6.3. In the illustrated embodiment, the closing spring 21 is designed as a helical compression spring and serves to close the vacuum valve 17. Thus, in the position of the vacuum valve 17 shown in FIG. 7, the piston 7.3 acts against the force of the closing spring 21 to open the same. The opened vacuum valve 17 provides a path between the outside of the battery housing and/or the pressure equalization device and the battery chamber. Ambient air can flow into the first chamber region 8.3 through the open valve 17 to bring about the desired pressure equalization. Once the pressure is adequately equalized and the restoring force of the closing spring 21 is greater than the vacuum being equalized, it pushes the valve stem 18 into its closed position.

Figure 8:
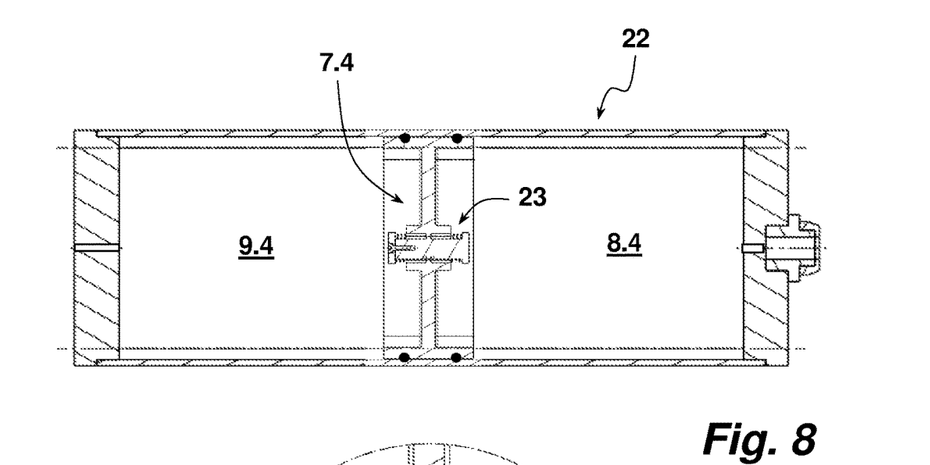
FIG. 8 shows a sectional view of a pressure equalization device generally corresponding to that of FIG. 2, in a further implementation and in a first position.
Figure 9:
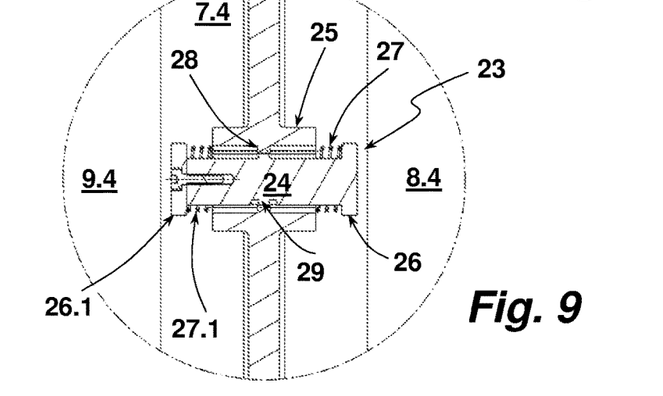
FIG. 9 shows a sectional view of the central region of the piston of the pressure equalization device of FIG. 8, in the closed position of a two-way valve.

FIG. 8 shows a further pressure equalization device 22 as part of a battery case (not shown). The pressure equalization device 22 operates in principle like the above-described pressure equalization devices. In contrast to the previously described pressure equalization devices, the piston 7.4 of the pressure equalization device 22 carries a two-way valve which furnishes an overpressure valve and a vacuum valve. This valve is identified by the reference numeral 23 in FIGS. 8 to 11. FIG. 9 shows the valve 23 in its neutral position when the same pressure prevails in the first chamber region 8.4 and the second chamber region 9.4, and thus it is not necessary to relieve an overpressure or a vacuum. The valve 23 is closed in this position. The valve 23 has a valve tappet 24 which is held in a valve guide 25 of the piston 7.4 in a manner allowing longitudinal movement. The valve tappet 24 carries head plates 26, 26.1 on each end face thereof. The head plates 26, 26.1 form projecting collars beyond the actual valve tappet 24, and each form a counter bearing for one helical compression spring 27, 27.1. Each helical compression spring 27, 27.1 is supported at its other end on the end face of the valve guide 25.

A fluid connection between the first chamber region 8.4 and the second chamber region 9.4 is provided by a circumferential sealing projection 28 of the valve guide 25, which acts against the surface of the valve tappet 24. The valve tappet 24 and the valve guide 25 each have a venting channel segment extending from the sealing projection towards the head plates 26, 26.1 in the sectional plane shown in the figures. The venting channel segments of the tappet 24 are separated from one another by a circumferential collar 29. This collar 29 acts against the sealing projection 28 when the valve 23 is in the neutral position.

Figure 10:
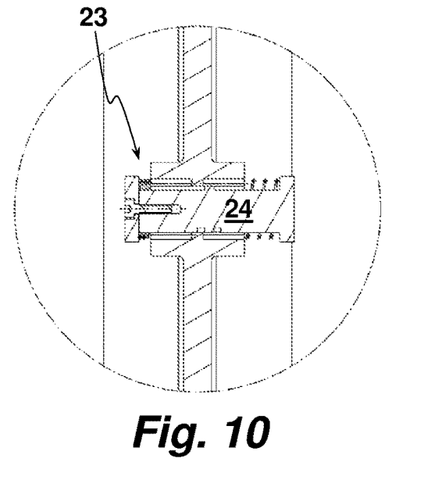
FIG. 10 shows a sectional view of the central region of the piston of the pressure equalization device of FIG. 8, in a first open position of the valve.

If a vacuum must be relieved and there is accordingly an overpressure in the second chamber region 9.4 relative to the chamber region 8.4, which can no longer be compensated by a movement of the piston 7.4 (vacuum in the battery chamber), the valve 23 opens towards the first chamber region 8.4 so as to provide a fluid connection from the second chamber region 9.4 into the first chamber region 8.4. This first position of the valve 23 is shown in FIG. 10.

Figure 11:
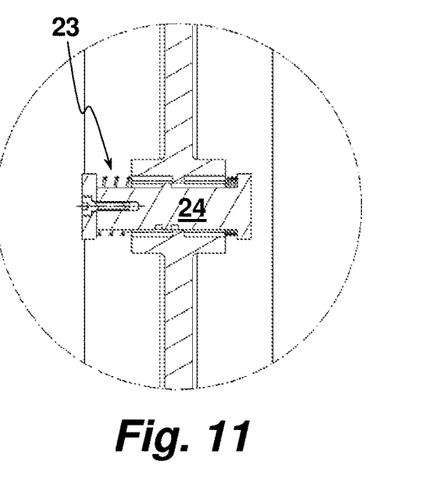
FIG. 11 shows a sectional view of the central region of the piston of the pressure equalization device of FIG. 8, in a second open position of the valve.

FIG. 11 shows the position of the valve 23 to relieve an overpressure from the first chamber region 8.4 into the second chamber region 9.4 (overpressure in the battery chamber). In both switch positions, the pressure is provided via the above-described venting channel segments, which are connected to one another by the longitudinal-axial movement of the valve tappet.

Figure 12:
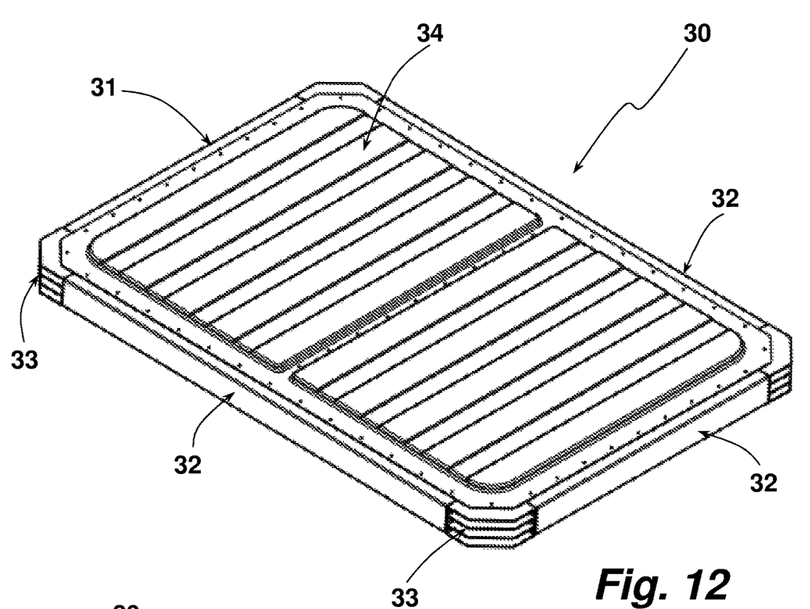
FIG. 12 shows a perspective view of a battery housing according to a further embodiment.
Figure 13:
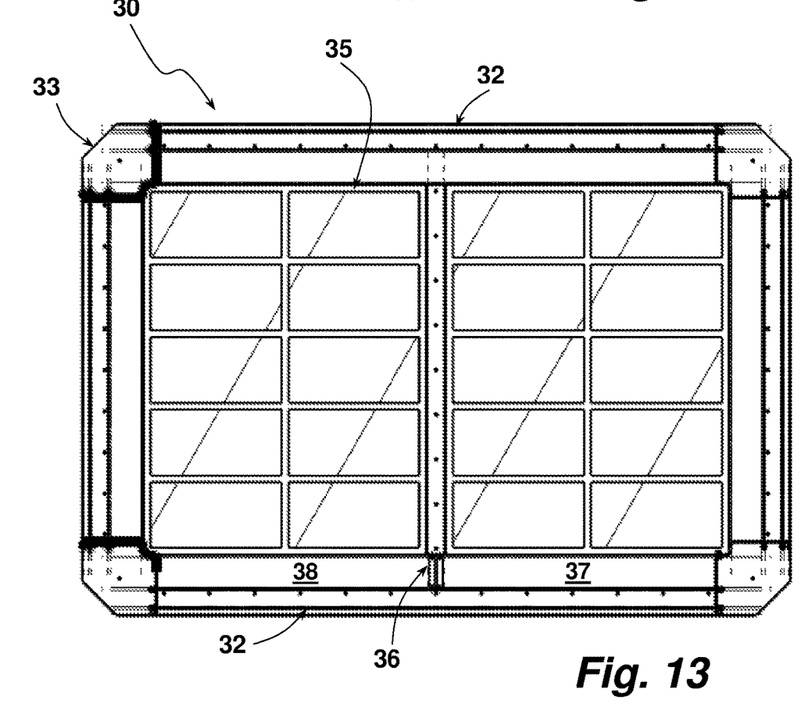
FIG. 13 shows a plan view of the open battery housing of FIG. 12.

FIG. 12 shows a further embodiment of a battery housing 30. The battery housing 30 to has a frame component 31. The frame component itself consists of a plurality of hollow chamber profiles 32 which are interconnected by corner pieces 33. The frame component 31 encloses a battery chamber and is closed on the top by a cover 34 and on the underside by a base, which is not shown in the figures. FIG. 13 shows a plan view of the battery housing 30, with the cover 34 removed. The battery chamber 35 can be seen, enclosed by the frame component 31. The lower hollow chamber profile 32 shown in FIG. 13 also constitutes a part of the pressure equalization device—namely the pressure equalization chamber. This is completed by a piston 36 arranged in this hollow-chamber profile 32, the same sealed against the inner wall of the hollow-chamber profile 32 and arranged in a manner allowing movement in the longitudinal-axial direction. The piston 36 can be seen in an enlarged sectional view in FIG. 14, which is shown as a section of the hollow chamber profile 32.

Figure 14:
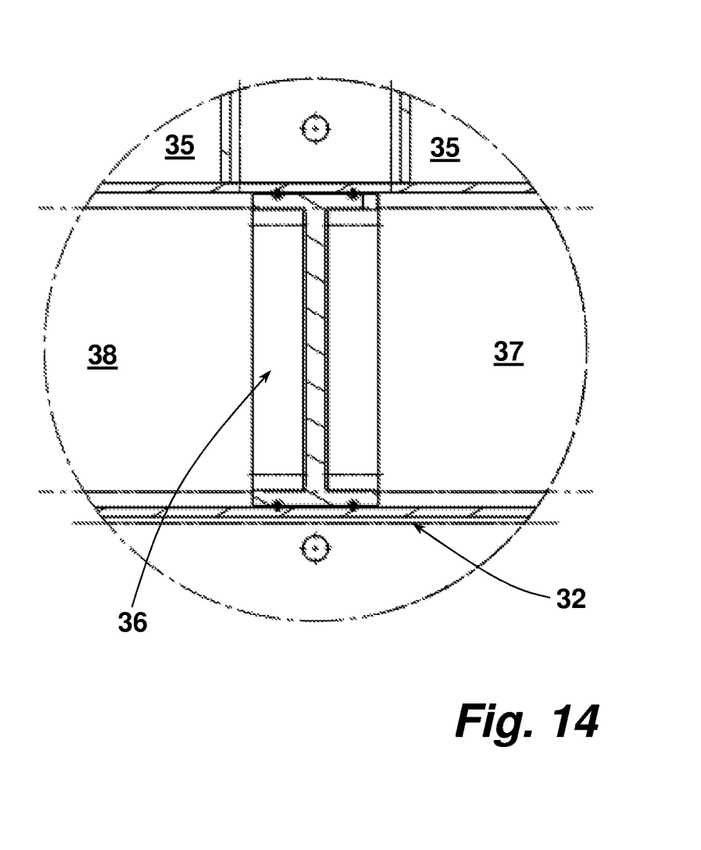
FIG. 14 shows an enlarged view of a portion of the pressure equalization device of the battery housing of FIG. 13.

The hollow chamber profile 32 is closed at the end by the corner pieces 33. A bore to the battery chamber furnishes the fluid connection between the battery chamber 35 and the first chamber region 37 of the pressure equalization chamber provided by the interior of the hollow chamber profile 32. A bore connecting to the outside of the battery housing 30 is included in the region of the end face termination of the other end of the hollow chamber profile 32, thereby establishing the fluid connection between the second chamber region 38 and the outside of the battery housing and/or the pressure equalization device.

The invention has been described with reference to embodiments. Without departing from the scope of the claims, many other embodiments are apparent to a person skilled in the art, allowing the same to implement the invention. While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically to disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

| | |
|---|---|
| 1 | battery housing |
| 2 | battery chamber |
| 3 | wall |
| 4 | pressure equalization device |
| 5 | hollow chamber profile |
| 6, 6.1, 6.2, 6.3 | end wall |
| 7, 7.1-7.4 | piston |
| 8, 8.1-8.4 | first chamber region |
| 9, 9.1-9.4 | second chamber region |
| 10 | connecting tube |
| 11, 11.1 | vent bore |
| 12 | pressure equalization device |
| 13 | compression spring |

-continued

LIST OF REFERENCE NUMERALS

| | |
|---|---|
| 14 | vent opening |
| 15 | pressure relief valve |
| 16 | pressure equalization device |
| 17 | vacuum valve |
| 18 | valve tappet |
| 19 | sealing head |
| 20 | actuating head |
| 21 | closing spring |
| 22 | pressure equalization device |
| 23 | valve |
| 24 | valve tappet |
| 25 | valve guide |
| 26, 26.1 | end plate |
| 27, 27.1 | helical compression spring |
| 28 | sealing projection |
| 29 | collar |
| 30 | battery housing |
| 31 | frame component |
| 32 | hollow chamber profile |
| 33 | corner piece |
| 34 | cover |
| 35 | battery chamber |
| 36 | piston |
| 37 | first chamber region |
| 38 | second chamber region |

The invention claimed is:

1. A battery housing comprising:
    a battery chamber sealed to prevent the penetration of moisture from an outside environment and which accommodates at least one battery module;
    a pressure equalization device to compensate for pressure fluctuations between the battery chamber and the outside environment, the pressure equalization device comprising a pressure equalization chamber;
    the pressure equalization chamber having a first chamber region and a second chamber region, wherein the first chamber region has a fluid connection to the battery chamber, and the second chamber region is in fluid communication with the outside environment via a first venting path; and
    a separating member arranged between the first chamber region and the second chamber region, the separating member fluidly sealed with respect to an inner wall of the pressure equalization chamber;
    wherein the separating member permits a volume change in one of the first or second chamber regions given a corresponding volume change in the other chamber region.

2. The battery housing of claim 1, wherein the pressure equalization device further comprises a pressure relief valve or a vent opening to relieve an overpressure in the first chamber region which cannot be sufficiently compensated by the mobility of the separating member in the pressure equalization chamber.

3. The battery housing of claim 2, wherein the separating member is a piston configured to move inside the pressure equalization chamber.

4. The battery housing of claim 3, wherein the piston opens the vent opening.

5. The battery housing of claim 4, wherein the end of the piston facing the second chamber region is supported on a compression spring, the compression spring tensioned by the piston when the piston is in an end position within the pressure equalization chamber collapsing the second chamber region, and wherein a second venting path between the first chamber region and the outside environment of the battery housing is open in said end position of the piston.

6. The battery housing of claim 3, wherein the pressure relief valve is formed on the piston and places the first chamber region in fluid communication with the second chamber region when the valve opening pressure of the pressure relief valve is exceeded in the first chamber region.

7. The battery housing of claim 1, wherein the pressure equalization device further comprises a vacuum valve to relieve a vacuum in the first chamber region which cannot be sufficiently compensated by the mobility of the separating member in the pressure equalization chamber.

8. The battery housing of claim 7, wherein the separating member is a piston configured to move inside the pressure equalization chamber.

9. The battery housing of claim 8, wherein the piston opens the vacuum valve.

10. The battery housing of claim 9, wherein the vacuum valve is formed on the end wall of the pressure equalization chamber which bounds the first chamber region and faces the separating member, the vacuum valve comprising a valve tappet which passes through said end wall, the valve tappet having a sealing head configured to lay against the outside of said end wall when the vacuum valve is closed, the vacuum valve also comprising a closing spring which holds the vacuum valve in its closed position and provides a restoring force against which the vacuum valve can be opened, wherein the valve tappet projects into the first chamber region to such an extent that the vacuum valve is opened by the piston when there is a vacuum in the first chamber region.

11. The battery housing of claim 8, wherein the vacuum valve is formed on the piston and places the first chamber region in fluid communication with the second chamber region when the valve opening pressure of the vacuum valve is exceeded in the second chamber region.

12. The battery housing of claim 1, wherein the pressure equalization device further comprises a pressure relief valve and a vacuum valve, the pressure relief valve configured to relieve an overpressure in the first chamber region which cannot be sufficiently compensated by the mobility of the separating member in the pressure equalization chamber, the vacuum valve configured to relieve a vacuum in the first chamber region which cannot be sufficiently compensated by the mobility of the separating member in the pressure equalization chamber.

13. The battery housing of claim 12, wherein the separating member is a piston configured to move inside the pressure equalization chamber.

14. The battery housing of claim 13, wherein the pressure relief valve and the vacuum valve are both formed on the piston, wherein the pressure relief valve places the first chamber region in fluid communication with the second chamber region when the valve opening pressure of the pressure relief valve is exceeded in the first chamber region, and wherein the vacuum valve places the first chamber region in fluid communication with the second chamber region when the valve opening pressure of the vacuum valve is exceeded in the second chamber region.

15. The battery housing of claim 14, wherein the pressure relief valve and the vacuum valve are arranged in a common piston opening.

16. The battery housing of claim 15, wherein the pressure relief valve and the vacuum valve form a two-way valve.

17. The battery housing of claim 1, further comprising a frame component having a hollow chamber profile, wherein the pressure equalization chamber is formed by the hollow chamber profile.

18. The battery housing of claim 17, further comprising a plurality of frame components having hollow chamber profiles which form a plurality of pressure equalization chambers.

19. The battery housing of claim 1, wherein the battery housing is arranged in a vehicle driven by an electric motor, and contains battery modules which are necessary for the operation of the vehicle.

* * * * *